L. HENDRICH.
WOOD TURNING MACHINE.
APPLICATION FILED MAR. 22, 1915.
1,200,836.
Patented Oct. 10, 1916.
2 SHEETS—SHEET 1.
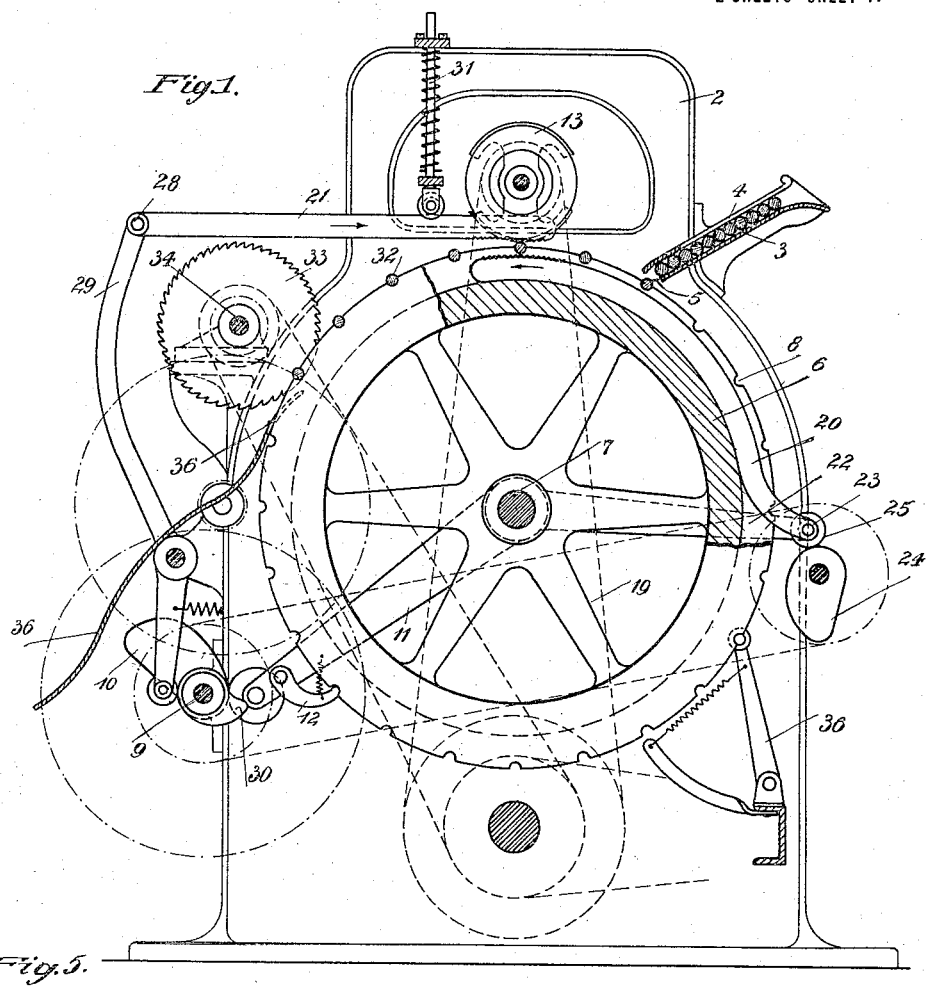
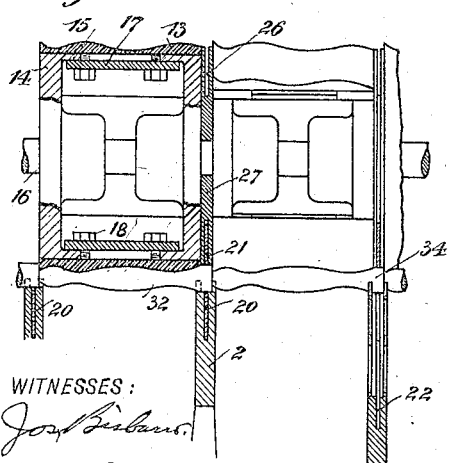
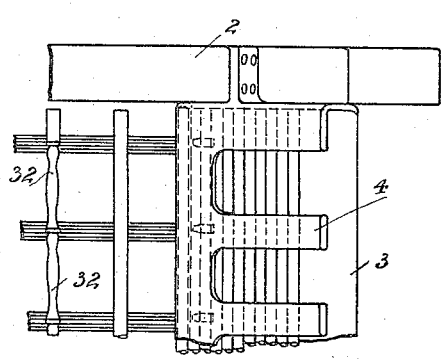
WITNESSES:
INVENTOR
Louis Hendrich
BY
ATTORNEY

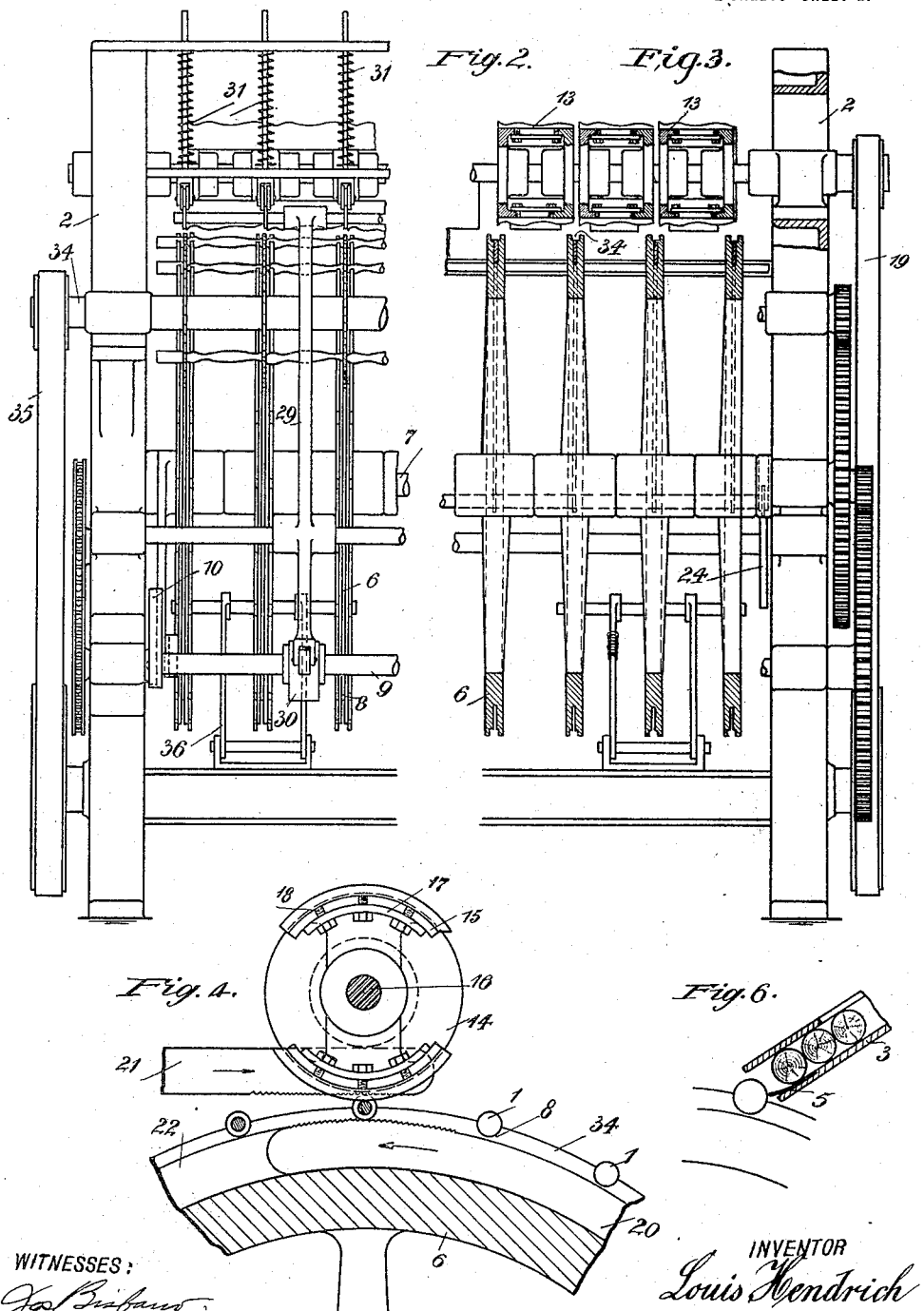

UNITED STATES PATENT OFFICE.

LOUIS HENDRICH, OF SACHSA, GERMANY, ASSIGNOR TO THE FIRM OF HARZER HOLZWAREN-FABRIK GEBR. LOHOFF, OF TETTENBORN, GERMANY.

WOOD-TURNING MACHINE.

1,200,836.      Specification of Letters Patent.      Patented Oct. 10, 1916.

Application filed March 22, 1915. Serial No. 16,128.

*To all whom it may concern:*

Be it known that I, LOUIS HENDRICH, a subject of the German Emperor, and resident of Sachsa, in the German Empire, have invented Improved and Novel Wood-Turning Machines, of which the following is a specification.

This invention relates to a machine for turning wooden articles, particularly such as linen cramps, clothes pegs, door and other handles, sticks, and the like; that is to say: articles of which a plurality is manufactured at a time by subjecting the respective piece of wood to the action, first, of a milling tool and then of a saw.

The characteristic feature of the invention resides chiefly in this that slides are arranged between the milling tools and in grooves of the feed mechanism which latter consists of disks or similar parts arranged in a certain distance from one another and having recesses intended to receive the wooden pieces to be worked in the machine, said slides being adapted to be moved in opposite directions between said tools and to take hold of each wooden piece at opposite places of same when the respective piece approaches the tools, after which the said piece is rotated around its axis by the said slides. This arrangement allows of turning a plurality of articles at a time and on the whole of their length by means of milling tools that take off thicker chips and exert a greater pressure upon the piece under operation.

In order to make my invention more clear, I refer to the annexed drawings which show one form of construction of the machine as an example, and in which:

Figure 1 is a cross-section through the machine, Fig. 2 is a rear view of the machine, Fig. 3 is section through the same, Fig. 4 is a cross-section through some of the milling tools, Fig. 5 is a longitudinal section through the same, Fig. 6 is a cross section through the feed table for the wooden pieces, and Fig. 7 is a plan of this table.

The wooden pieces or bars 1, the length of which may be chosen according to the breadth of the machine and the number of articles to be produced, are fed upon an oblique table 3 (Fig. 6) which is fixed at its both ends to the side parts 2 of the frame. Above the table 3 is arranged a guide rail 4, the distance of which from the table is equal to the diameter of the wooden bars 1, so that only one row of bars can find access to the table behind that rail. Springs 5 (Fig. 5) affixed to the table at its rear edge prevent the foremost bar from rolling unintentionally off the table, and the bar already seized by the mechanical feed device from rebounding upon the table. This feed device by which the wooden bars pressed off the table are successively conducted to the milling tools consists of a kind of roller composed of separately arranged disks 6 supported by a common axle 7. The disks have, at their circumferences, recesses 8, and they are rotated at intervals in steps corresponding to the distance between two recesses by means of a pawl 12 attached to a lever 11 and actuated by an eccentric 10 (Fig. 1). When such a partial rotary movement is finished, a checking bolt attached to a lever 36 (Figs. 1 and 2) and pressed elastically against the disk at the opposite side of same enters the recess just situated in front of it and stops all disks during the back movement of the beforementioned pawl.

The wooden bars 1 are introduced into the recesses 8, while the roller, or the set of disks respectively, is at rest, either by hand or automatically, *i. e.* by means of a pressure exerted upon the uppermost bar, after which the disks perform their partial rotary movement so as to carry the respective bar to the milling tools. These are secured to disks 14, at the circumference of the same, by clamping plates 17 and screws 18 (Figs. 3 and 4); the disks 14 are carried by a shaft 16. The plates 17 take below laterally extending noses or lugs 15 of the disks 14, and by turning the screws 18 home, the milling tools are pressed against the circumference of the disks 14 and against the lugs 15. By this means the milling tools are rigidly held in their position, and the neighboring tools may be arranged in close proximity to one another or with but very small distance between them. The shaft 16 is driven by a belt 19. Owing to the rotation of the disks 6, the wooden bars are carried to the milling tools, and just then they are seized by toothed rails 20 21 and are rotated around their axis while the milling is going on.

The slides 20 which seize the bar from below are located in a groove 22 (Figs. 3 and 4) of the disk rim, and their lower bent-off ends are secured to a common shaft 23 carried by lever-arms supported by the axle 7. The movement of the slides which takes place while the disks 6 are at rest is effected by continually driven eccentrics 24 operating the shaft 23 by the mediation of rolls 25 attached to this shaft.

The slides 21 which are made of thin rails which act upon the upper surface of the bars 1 and the free ends of which take into grooves 26 of limiting disks 27 (Fig. 4) located between the cutting disks 14 and being put upon the bars and determining the chip depth, are also attached to a common shaft 28 (Fig. 1), which is rocked in a direction opposite to that of the slides 20 by means of an eccentric 30 secured to the shaft 9, and by the mediation of double-armed levers 29 actuated by said eccentric. Pressure spindles 31 acting upon the upper edge of the slides 21 press, at the same time, the toothed lower front edge of said slides upon the said bars.

The completely milled work pieces 21 which, however, are not yet separated, but are connected at the places where the milled bars are supported by the disks 6 get then to the saws 33 which are situated in the same vertical planes as the slides 20, 21 and take into enlargements 34 of the disk grooves 22. The bar is thus cut through exactly at those places where it had been seized by the slides during the milling operation. The not milled parts of the bar are thus removed while the bar is cut through so that the articles although each has been clamped in not at its frontal ends but at its circumference may be milled upon the whole length of each of them. The saw blades 33 are supported by a shaft 34 driven by a belt 35. The thus far finished articles drop after the cutting operation upon a guide plate 36 taking between the disks 6, when they may be collected and further worked in order to get finished.

Having now described my invention, what I desire to secure by a patent of the United States is:

1. In a wood turning machine, milling tools, means for operating them, means for moving wooden bars to said milling tools to be operated upon, slides one above the other adapted to seize and revolve said wooden bars on opposite sides thereof while they are being operated upon by said milling tools, and means for simultaneously moving said slides in opposite directions after they have engaged said wooden bars and when said wooden bars are being operated upon by said milling tools.

2. A wood turning machine, milling tools, means for revolving said milling tools, spaced disks, recesses in said disks adapted to receive and convey wooden bars to said milling tools, means for revolving said disks step by step, grooves in said disks, slides located in said grooves and adapted to grip said wooden bars on opposite sides thereof and revolve them, and means for simultaneously moving said slides in opposite directions after they have engaged said wooden bars and when said wooden bars are being operated upon by said milling tools.

3. A wood turning machine, milling tools, saws, means for operating said milling tools and saws, means for moving wooden bars to said milling tools and then to said saws to be operated upon, gripping means for revolving said wooden bars while they are being operated upon by said milling tools, said saws being arranged in the same vertical planes with said gripping means, whereby said wooden bars are severed at the same places where they were gripped by said gripping means.

4. In a wood turning machine, milling tools, saws, and means for operating them, means for moving wooden bars from said milling tools to said saws, disks having recesses adapted to receive and convey said wooden bars to said milling tools, means for revolving said disk step by step, grooves in said disks, slides consisting of thin rails, arranged edgewise and located in said grooves and adapted to engage said bars on opposite sides thereof and to be moved between said milling tools in opposite directions to one another, and means for moving said slides, said saws being located in the same vertical planes as the said slides.

5. In a wood turning machine, milling tools attached to disks, saws, means for revolving said disks and operating said saws, means for moving wooden bars to be operated upon, to said milling tools and to said saws, said disks for said milling tools having lateral lugs projecting therefrom, clamping plates below said lugs and means for pressing said clamping plates against said lugs to hold the intermediate milling tools, slides made up of thin rails intermediate said milling tools, and means for operating said slides in opposite directions so as to grip said wooden bars on opposite sides thereof and revolve them while said wooden bars are being operated upon by said milling tools, said slides and said saws being in the same vertical plane.

In testimony whereof I affix my signature in presence of two witnesses.

LOUIS HENDRICH.

Witnesses:
 GUSTAV LOHOFF,
 A. WERNER.